Nov. 14, 1950     E. T. JULIUS     2,529,698
FILTER APPARATUS
Filed July 13, 1946
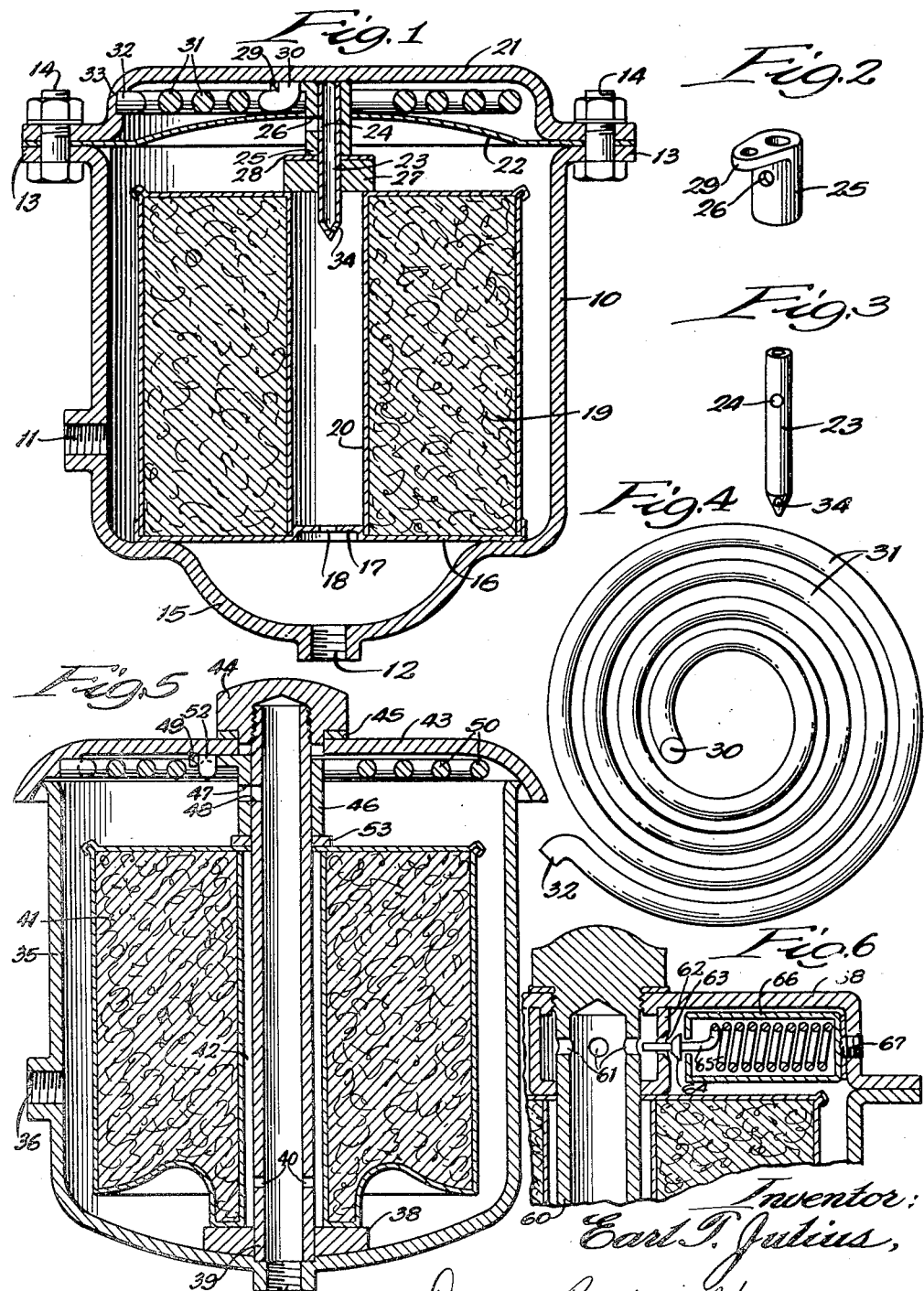
Inventor:
Earl T. Julius,
By Dawson, Booth and Spangenberg,
Attorneys.

Patented Nov. 14, 1950

2,529,698

UNITED STATES PATENT OFFICE 2,529,698

FILTER APPARATUS

Earl T. Julius, Skokie, Ill.

Application July 13, 1946, Serial No. 683,472

2 Claims. (Cl. 210—183)

This invention relates to filter apparatus and is particularly useful for the filtering of a stream of liquid such as oil supplied to a motor of the automotive types and other types.

In the use of lubricating oil filters as today employed in connection with automobile motors, etc., it is found that the filtering material which is generally formed of cotton thread waste, etc., when saturated with oil, dirt, carbon, sludge, etc., is too stiff or heavy when cold to allow the oil pumped from the engine crankcase to flow through the filtering material. Consequently, lubricating oil filters are of little value in cold weather and particularly on short trips. Even if a by-pass should be employed, the filter as a whole is not subjected sufficiently to the warm oil to produce a quick pre-heating of the filtering material so as to enable it to function properly.

An object of the present invention is to provide a filter structure which will circulate warm or heated oil around a filter and through a central aperture therein so as to quickly pre-heat the filter and render it effective as a filtering means even for relatively short trips. A further object is to provide an effective temperature responsive device for controlling the circulation of heated oil about and through a central passage of the filter and, after a pre-determined temperature has been reached, causing substantially all of the oil to pass through the filter. A further object is to provide a filter closure or head which may be attached to existing filter casings to effectively control the by-passing of oil during the warming stage through the central passage of the filter while stopping such circulation and requiring the oil to pass through the filtering material after a pre-determined temperature has been reached. Yet another object is to provide a filter head or closure removably secured to a standard oil filter for controlling the cycling of oil through the central passage of the filter and checking such cycling after the filtering material has been heated to a predetermined temperature. Other specific objects and advantages will appear as the specification proceeds.

The invention is illustrated, in preferred embodiments, by the accompanying drawing, in which—

Figure 1 is a vertical sectional view of a filter structure embodying my invention; Fig. 2, a perspective view of a valve control sleeve employed; Fig. 3, a perspective view of a flow tube secured to the closure; Fig. 4, a plan view of the heat expansion control coil employed; Fig. 5, a vertical sectional view of a modified form of filter structure; and Fig. 6, a broken vertical sectional view of a modified form of structure embodying my invention.

In the embodiment illustrated in Figs. 1 to 4 inclusive, 10 designates a casing provided on one side with an inlet opening 11 and at its bottom side with an outlet opening 12. The casing 10 is provided at its top side with an outwardly flared flange 13 provided with spaced preforations adapted to receive the locking bolts 14.

The casing 10 is shown provided with a central dished bottom portion 15. Above the portion 15 and resting on a bottom flange is an imperforate disc 16 having a centrally upwardly-projected portion 17 provided centrally with an aperture 18. A cartridge of filtering material 19 is supported upon the disc 16 and is provided with a central passage 20. The cartridge 19 may be of any suitable type or construction. It may simply be formed of a batt of thread waste or the like forming a filtering body or it may be formed by enclosing any fibrous or other filtering material within a metal container having perforations therein through which the oil may enter the filtering body 19 and also may enter the central tubular passage 20. Since such filter bodies are well known, a further description of the cartridge 19 is believed unnecessary.

Mounted upon the flange 13 of the casing 10 is a closure member 21 having lateral flanges perforated to receive the locking bolts 14. A sealing disc 22 is also clamped in position between the flanges of the closure and flanges 13 so as to maintain the oil or other liquid within the chamber below.

Secured centrally to the closure 21 by spot welding or other means is a tubular member 23 provided with a lateral port 24. A valve collar or sleeve 25 is provided with a port 26 alignable with port 24 and the sleeve 25 is freely received upon the tube 23. Fixed to the lower end of the tube 23 is a sealing member 27 which may be welded to the tube 23 or threadedly secured thereto and a washer 28 may be provided between sleeve 25 and sealing member 27. It will be noted that the seealing member 27 is wide enough to close off the central flow passage 20 entirely when the closure 21 is in operation position, as illustrated in Fig. 1.

The sleeve member 25 is centrally apertured to receive the tube 23 and is provided at its top with a laterally extending arm 29. The arm 29 is apertured to receive the upwardly turned end 30 of the expansion coil element 31. The outer end of the expansion coil element 31 is provided with an outwardly turned end portion 32 received within a recess 33 of the closure 21.

The lower end of tube 23 may be brought to a closed point, as illustrated best in Figs. 1 and 3 and provided with a transverse outlet passage 34.

It will be noted that the closure 21 provides a self-contained unit and is adapted to be applied to any standard filter casing having the usual filter cartridge 19 disposed therein.

Operation

In the operation of the filter structure, oil from the engine crankcase, etc. is pumped to the inlet 11 and into the filter chamber. While the oil is relatively cold, the parts are positioned, as illustrated in Fig. 1, and the oil flows through the aperture 26, port 24 and thence downwardly through the ports 34 into the central passage 20 of the filter cartridge and thence outwardly through the opening 18 and outlet opening 12 to the return conduit. As the oil becomes warmer, its passage about the filter 19 and through the central passage 20 thereof warms the filter both from its exterior and internal surfaces and quickly brings it to the temperature of the circulated oil. The pre-heating of the filtering material renders it efficient as a filtering means and when a predetermined temperature has been reached, the element 31 expands and its movable end 30 causes a rotation of the sleeve 25 so as to close off the aperture 24. Thereafter, the oil is required to flow through the openings of the filter cartridge and through the filtering material and the central passage 20, and thence outwardly through the outlet passage 12. The baffle or sealing disc 22 causes the flow of the oil to remain within the chamber below coils 31 and also serves to delay the action of the warm oil on the coil for a sufficient period of time to let the filter cartridge warm up sufficiently for effective filtration.

The coil of the thermostat or expansion element 31 may be formed of copper or any material having the desired quality of expansion and contraction to give the action needed. Further, the length of wire or ribbon 31 may be modified to give the necessary movement for opening and closing the aperture 24.

In the modification illustrated in Fig. 5, the casing 35 is provided with an inlet 36 and an outlet 37. A sealing member 38 may be secured in the bottom portion of the chamber 35 and may be secured by welding or other means to a tube 39. The tube 39 may be provided with openings 40 through which oil may be received within the tube 39 from the interior of the filter.

The filter 41 may be formed of any suitable filtering material held within a perforated metal container so that oil may enter the filtering material and may then pass out interiorly into the central passage 42 of the filter cartridge.

A closure 43 is held in position upon casing 35 by a clamp nut 44 threadedly engaging the upper end of tube 39 and a sealing gasket 45 may be employed between nut 44 and closure 43. A control sleeve 46 is rotatably carried about tube 39 and is provided with an aperture 47 aligned when the structure is cold with the aperture 48 of tube 39. The sleeve 47 is provided at its upper end with an apertured arm 49. An expansion coil 50 is mounted in the upper end of closure member 43 with one end thereof fixed within a recess of the closure 43 and the other end 52 turned upwardly and received within the recess of arm 49.

In the operation of the modified structure in Fig. 5, oil, when cold, passes through inlet 36 and through the aligned apertures 47 and 48 and the tube 39 and thence downwardly through outlet 37. When a temperature has been attained under which a thorough pre-heating of the filter 41 is brought about, the expansion element 50 rotates the arm 49 to close the aperture 48 of tube 39 and thereafter oil passes through the apertured metal casing of filter 41 and then into central passage 42 and thence outwardly through passages 40 into tube 39 and outlet 37.

A sealing collar 53 may be welded or otherwise secured to the tube 39 so as to form a seal for the central passage 42 of the filter cartridge while at the same time providing a support for the sleeve 46.

In both of the modifications illustrated, it will be noted that the closure is a complete unit in itself carrying means for sealing the central passage of the filter and for admitting a regulated amount of oil to the central passage for recycling. The closure also carries its own thermostatically controlled means for closing off the circulation through the central passage of the filter and requiring the heated oil to pass through the filter cartridge into the central passage thereof.

The closures are adapted to be secured to any standard filter structure and are readily removable. If desired, the head may be removed during hot weather or summer months and a simple closure head substituted. The thermostatically controlled head may be placed again in position for use during the winter months, etc. The structure is simple, requiring no modification of existing filter casings and is readily adaptable thereto for efficiently controlling the recirculation of oil and preheating of the filter.

With the structure described, it will be noted that the filter is preheated within an extremely short time because the incoming oil is caused to flow not only around the filter cartridge but through its interior so that the heat traverses the filter body not only from the exterior side but also from the interior side and with the result that the filter, when placed in use, is warmed uniformly throughout and is not merely warmed along its exterior side.

In the modification shown in Fig. 6, the central tube 60 is perforated at 61 and is surrounded by an enclosure 62 provided with an inlet opening 63. The inlet opening 63 provides a valve seat adapted to receive the valve member 64 carried by the expansion spring 65. The expansion spring 65 may be housed within a casing 66 provided with a reduced threaded extension 67 engaging a tapped opening in the casing 68.

In the operation of the modification shown in Fig. 6, while the oil is relatively cool, it will circulate around the filter and through opening 63, perforations 61, and thence downwardly through the tube 60 to the outlet at the bottom of the casing. When the oil reaches a predetermined temperature, the spring 65 expands sufficiently to bring the valve 64 into engagement with the seat 63, and thereafter the oil has to pass through the filter itself in order to reach the outlet. In this construction, no rotary valve is employed, but the movement of valve 64 is in a longitudinal direction when closing the opening 63.

While in the foregoing specification I have set forth specific embodiments illustrating in detail modes in which the invention may be practiced, it will be understood that the details set out may be modified widely by those skilled in the art without departing from the spirit of my invention.

I claim:

1. A filter adapted for the treating of oil, comprising a casing providing a filter chamber open at its top, a head casing recessed on its lower side to provide a head chamber above the filter chamber, means for releasably securing said casing members together, a filter cartridge in said filter chamber provided with a vertical central passage, means for introducing liquid into said chamber about the exterior of said cartridge, means communicating with the lower end of said central passage for withdrawing liquid, a closure for the upper end of said passage and having an aperture therethrough, a tube extending through said aperture and upwardly into said head chamber, said tube having a laterally-opening port, a sleeve rotatably mounted on said tube and having an inlet opening alignable with the port of said tube, and a temperature-responsive coil member having one end anchored to said head casing and the other end anchored to said sleeve for rotating said sleeve when the temperature of the incoming liquid reaches a predetermined temperature and causes an expansion of said temperature-responsive coil, said sleeve being removable from said tube and with said head casing when the head casing is separated from said first-mentioned casing.

2. A filter structure for treating a stream of oil, comprising a casing providing a filter chamber open at its top, a head casing having a recess on its inner side providing a head chamber, means for releasably securing together the two casings, a filter cartridge in said filter chamber provided with a central vertical passage, means for introducing liquid into said filter chamber about said filter, means for withdrawing liquid from the lower portion of the central passage in said filter, a closure for the upper end having a central aperture therethrough, a tube extending into said central passage and through the aperture of said closure into the chamber thereabove, said tube being in communication with the interior of said central passage and having the upper portion thereof above said closure provided with an inlet port, a sleeve rotatably mounted upon said tube and provided with an inlet passage adapted to be brought into alignment with said inlet port of said tube, said sleeve having an arm at its upper end extending radially therefrom, and an expansion coil in said head chamber having one end secured to the radially-extending arm of said sleeve and having its outer end fixed to said head casing, said sleeve being freely slidable upon said tube.

EARL T. JULIUS.

REFERENCES CITED

The following references are of record in the file of this patent:

UNITED STATES PATENTS

| Number | Name | Date |
| --- | --- | --- |
| 288,622 | Copeland | Nov. 20, 1883 |
| 1,813,122 | Moore | July 7, 1931 |
| 1,989,598 | Kline | Jan. 29, 1935 |
| 2,005,751 | Peo | June 25, 1935 |
| 2,106,863 | Whitney | Feb. 1, 1938 |
| 2,250,299 | Downing | July 22, 1941 |
| 2,294,330 | Clark | Aug. 25, 1942 |
| 2,389,555 | Sharples | Nov. 20, 1945 |